United States Patent [19]

Fukuda et al.

[11] Patent Number: 4,814,427

[45] Date of Patent: Mar. 21, 1989

[54] PRIMER FOR L-CYANOACRYLATE-BASE RESIN COMPOSITIONS

[75] Inventors: Kazuhide Fukuda; Atsushi Okuma; Miwako Ota, all of Hachioji, Japan

[73] Assignee: Three Bond Company, Ltd., Tokyo, Japan

[21] Appl. No.: 118,312

[22] Filed: Nov. 6, 1987

[51] Int. Cl.[4] .................................................. C08G 8/00
[52] U.S. Cl. .................................... 528/230; 528/266; 427/404; 427/407.1
[58] Field of Search ................ 528/230, 266; 427/404, 427/407.1

[56] References Cited

U.S. PATENT DOCUMENTS 4,367,247  1/1983  Akerberg ........................... 427/302

Primary Examiner—John Kight
Assistant Examiner—S. A. Acquah
Attorney, Agent, or Firm—Donald D. Mon

[57] ABSTRACT

A primer for α-cyanoacrylate-based resin compositions, which is disclosed herein, comprises (A) a compound selected from the group consisting of benzene ring compounds having aldehyde group and nitrogen or oxygen atom-containing heterocyclic compounds having aldehyde group, and (B) an organic amine compound. In bonding, coating or printing various non-polar or highly crystallized resins, the primer exhibits a high bonding strength by a simple procedure.

15 Claims, No Drawings

PRIMER FOR L-CYANOACRYLATE-BASE RESIN COMPOSITIONS

BACKGROUND OF THE INVENTION

1. FIELD OF THE INVENTION

The present invention relates to a primer for α-cyanoacrylate-based resin compositions for use in bonding non-polar or highly crystallized resins such as polyolefins, polyethylene terephthalates, nylons, fluorine-containing resins, soft PVC films, etc., or in coating and printing such resins or other applications, and more particularly, to a primer for α-cyanoacrylate resin compositions, which can exhibit a high bonding strength by a simple procedure.

2. DESCRIPTION OF THE PRIOR ART

The above non-polar or highly crystallized resins are extremely useful for sheets or molded products used in automobiles, electric appliances, etc., and can find many utilizations, because they have a light weight and excellent properties such as physical properties and a noncorrosive property. With such molded products or the like, however, the following problem is encountered: In fixing them to other parts or in coating their surfaces for use, bonding or coating is difficult, because they are non-polar or highly crystallized resins as described above.

Thereupon, several approaches to improve an adhesion property or the like have been proposed. For example:

(a) A method for partially oxidizing and activating difficultly-bondable materials such as polyethylenes and polypropylenes by a flame-treatment, a corona discharge, an irradiation or another treatment thereof;

(b) The use, as an undercoating, of a primer comprising a polyethylene chloride, a polypropylene chloride or a fatty acid-modified alkyd resin dissolved in an organic solvent (see Japanese Patent Application Laid-open Nos. 98062/77; 141328/81; and 119929/82); and (c) The use, as an undercoating, of a primer comprising an organic metallic compound in association with an α-cyanoacrylate-based adhesive (see Japanese Patent Application No. 203684/85).

With such a method for oxidizing and activating the difficultyly-bondable material by the flame treatment or another treatment thereof, as described in the above item (a), however, a special treating system and process are required and particularly, when a uniform treatment is not performed for a material of a complicated configuration which is to be bonded, an operation is troublesome and a lining cost is increased, resulting in a decreased economy.

With the primer described in the item (b) and employing polyethylene chloride or the like, there are pointed out disadvantages that even though an adherability thereof to polyolefins is good, an adherability to final coatings is poor, and even when such primer exhibits a good adherability to final coatings and polyolefins, an adherability between films is reduced as a result of repeating of a cold cycle (see Japanese Patent Application Laid-open No. 8734/83).

Further, the primer described in the item (c) has an adhesion property as high as a fracture of material to molded products of polypropylene, but have an insufficient bonding strength to molded products of polyethylene and have not a strength as high as a fracture of material. In addition, resistances to water and humidity at a joint formed between bonded materials are being improved, but are still insufficient, and a sufficient bonding strength cannot be satisfactorily maintained.

SUMMARY OF THE INVENTION

It is therefore an object of the present invention to provide a primer for α-cyanoacrylate-based resin compositions, in which the disadvantages associated with the above prior art are overcome and which exhibits a higher bonding or adhesion strength by a simple procedure in bonding non-polar or highly crystallizied resins with an α-cyanoacrylate-based adhesive, or in coating or printing such resins with an ink.

According to the present invention, the above object is accomplished by providing a primer for α-cyanoacrylate-based resin compositions, comprising the following components (A) and (B):

(A) a compound selected from the group consisting of benzene ring compounds having aldehyde group and nitrogen or oxygen atom-containing heterocyclic compounds having aldehyde group; and (B) an organic amine compound.

DETAILED DESCRIPTION OF THE INVENTION

The benzene ring compounds having aldehyde group in component (A) are benzaldehyde type compounds, specifically including benzaldehyde, dimethylbenzaldehyde, diethylbenzaldehyde, p-dimethylbenzaldehyde, aminobenzaldehyde, etc., and are aldehyde aniline type compounds such as compounds produced from a dehydration condensation of an aldehyde and an aniline, specifically including acetoaldehyde aniline, propionaldehyde aniline, butylaldehyde aniline, pentylaldehyde aniline, hexylaldehyde aniline, pentaldehyde aniline, etc.

The nitrogen atom-containing heterocyclic compounds having aldehyde group in the component (A) include 2-pyridine carboxylaldehyde, 2, 6-pyridine carboxylaldehyde, pyrrole 2-carboxylaldehyde, etc., and further, the oxygen atom-containing heterocyclic compounds having aldehyde group include furfural, etc.

The component (A) of the present invention is one or more selected from the group consisting of the aforesaid benzene ring compounds having aldehyde group and the aforesaid nitrogen or oxygen atom-containing heterocyclic compounds having aldehyde group.

The component (B) is an organic amine compound having both of OH and amino groups in its molecule, specifically including dimethylaminopropanol, diethylaminopropanol, diethlaminopentanol, dimethylaminohexanol, 2-dimethylamino-2-methylpropanol, etc., and is also an alkyldiamine represented by a general formula:

$R(NH_2)_2$ wherein R represents $C_nH_{2n}$ (n=1 to 10), specifically including ethylenediamine, propylenediamine, butylenediamine, hexamethylenediamine, octamethylenediamine, decamethylenediamine, etc., and further including diethylenetriamine, triethylenetetramine, N-methyldiethanolamine, etc.

The above-described components (A) and (B) are respectively dissolved in a solvent such as methanol and chlorothene and blended at a weight ratio of 1:1 or more to provide a primer according to the present invention.

In bonding non-polar or highly crystallized resins such as polyolefins, polyethyleneterephthalates, polyacetal, nylons, fluorine-containing resins, soft PVC films containing a large amount of a plasticizer, etc., using α-cyanoacrylate-based adhesive, the above-described primer according to the present invention instantaneously exhibits a high bonding strength at ambient temperature by a simple procedure which comprises applying such primer onto a surface of one of the resins, applying the α-cyanoacrylate-based adhesive onto a surface of the other resin and bringing both the surfaces into contact with each other.

In addition, in coating or printing the above-described non-polar or highly crystallized resins with an α-cyanoacrylate-based resin coating or ink, the primer according to the present invention exhibits instantaneously exhibits a high bonding strength at ambient temperature by a simple procedure which comprises applying such primer onto a surface to be coated or printed, and then effecting the coating or printing thereof.

EXAMPLE

As given in Table 1, individual components (A) and individual components (B) were dissolved in a solvent and blended to prepare primers of sample Nos. 1 to 6 according to the present invention.

These samples were subjected to a bonding strength test according to JIS K6861-1977 testing procedure, and the results are given in Table 1. More specifically, non-polar or highly crystallized resin Nos. 1 to 5 were prepared two by two, the primer sample Nos. 1 to 6 were respectively applied onto surfaces to be affixed of these resin pieces. The solvent was volatilized and then, the surfaces were affixed and bonded with an α-cyanoacrylate-based adhesive (TB1741 available from Three Bond Co., Ltd.) at ambient temperature to determine a tensile shear bonding strength (kg/cm$^2$). In Table 1, the non-polar or highly crystallized resin Nos. 1 to 5 are as follows:

(1) Polyethylene
(2) polypropylene
(3) polyacetal
(4) Silicone rubber
(5) 6, 6-nylon In addition, * represents a fracture of material.

What is claimed is:

1. A primer for α-cyanoacrylate-based resin compositions, comprising the following components (A) and (B):
   (A) a compound selected from the group consisting of benzene ring compounds having aldehyde group and nitrogen or oxygen atom-containing heterocyclic compounds having aldehyde group; and
   (B) an organic amine compound.

2. A primer according to claim 1, wherein the benzene ring compound having aldehyde group in the component (A) is a benzaldehyde type compound.

3. A primer according to claim 2, wherein the benzaldehyde type compound selected from the group consisting of benzaldehyde, dimethylaminobenzaldehyde, diethylaminobenzaldehyde, p-dimethylbenzaldehyde, and aminoadlehyde.

4. A primer according to claim 1, wherein the benzene ring compound having aldehyde group in the component (A) is terephthalaldehyde.

5. A primer according to claim 1, wherein the benzene ring compound having aldehyde group in the component (A) is an aldehyde aniline type compound.

6. A primer according to claim 5, wherein the aldehyde aniline type compound is produced from a dehydration condensation of an aldehyde and an aniline.

7. A primer according to claim 5 or 6, wherein the aldehyde aniline type compound is selected from the group consisting of acetoaldehyde aniline, propionaldehyde aniline, butylaldehyde aniline, pentylaldehyde aniline, hexylaldehyde aniline, and pentaldehyde aniline.

8. A primer according to claim 1, wherein the nitrogen atom-containing heterocyclic compound having aldehyde in the component (A) is selcted from 2-pyridine carboxylaldehyde, 2,6-pyridine carboxylaldehyde, and pyrrole 2-carboxylaldehyde.

9. A primer according to claim 1, wherein the oxygen atom-containing heterocyclic compound having aldehyde in the component (A) is furfural.

10. A primer according to claim 1, wherein the component (B) is an organic amine compound having both of OH and amino groups in its molecule.

11. A primer according to claim 9, wherein the organic amine compound having both of OH and amino groups in its molecule is selected from dimethylaminopropanol, diethylaminopropanol, diethylaminopentanol, dimethylhexanol, and 2-dimethylamino-2-methylpropanol.

TABLE 1

| Sample No. | Component (A) (part by weight) | Component (B) (part by weight) | Solvent | Bonding strength kg/cm$^2$ (1) | (2) | (3) | (4) | (5) |
|---|---|---|---|---|---|---|---|---|
| 1 | Terephthalaldehyde (0.01) | Diethylenetriamine (1.0) | Methanol | 30 | 42* | 30 | 5* | |
| 2 | n-butylaldehyde aniline (0.1) | Dimethylamino-hexanol (0.2) | Chlorothene | 43* | 44* | 47* | 6* | |
| 3 | P—dimethylbenzaldehyde (0.1) | N—methyldiethanol (1.0) | Methanol | 43* | 45* | 43* | 7* | 55* |
| 4 | 2-Pyridinecarboxylaldehyde (0.1) | Triethylenetetramine (1.0) | Methanol | 44* | 48* | | | |
| 5 | Pyrrole-2-carboxylaldehyde (0.1) | Triethylenetetramine (1.0) | Methanol | 43* | 46* | | | |
| 6 | Heptaldehyde aniline (0.05) + 2,6-Pyridine-carboxylaldehyde (0.05) | Decamethylenediamine (0.1) | Methanol | 30 | 43* | | | |

*represents a fracture of material.

12. A primer according to claim 1, wherein the component (B) is an alkyldiamine represented by a general formula:

R(NH$_2$)$_2$ wherein R represents C$_n$H$_2$n where n is an integer of 1 to 10.

13. A primer according to claim 1, wherein said alkyldiamine is selected from the group consisting of ethylenediamine, propylenediamine, butylenediamine, hexamethylenediamine, octamethylenediamine, and decamethylenediamine.

14. A primer according to claim 1, wherein the component (B) is selected from the group consisting of diehtylenetriamine, N-methyldiethanolamine, and triehtylenetetramine.

15. A primer according to claim 1, wherein said components (A) and (B) are blended at a weight ration of 1:1 or more.

* * * * *